(12) United States Patent
Shyr et al.

(10) Patent No.: US 7,904,096 B2
(45) Date of Patent: Mar. 8, 2011

(54) GPS APPLICATION USING NETWORK ASSISTANCE

(75) Inventors: You-Yuh Shyr, San Jose, CA (US);
Mingqiang Cheng, Sichuan (CN); Bo Yu, Sichuan (CN)

(73) Assignee: O2Micro International Limited, Grand Cayman (KY)

( * ) Notice: Subject to any disclaimer, the term of this patent is extended or adjusted under 35 U.S.C. 154(b) by 735 days.

(21) Appl. No.: 11/506,499

(22) Filed: Aug. 18, 2006

(65) Prior Publication Data

US 2007/0072623 A1 Mar. 29, 2007

Related U.S. Application Data

(60) Provisional application No. 60/714,890, filed on Sep. 6, 2005.

(51) Int. Cl.
*H04W 24/00* (2009.01)
(52) U.S. Cl. ............. 455/456.1; 455/456.5; 455/404.2; 455/414.2

(58) Field of Classification Search ........... 455/456.1, 455/456.5, 404.2, 414.2
See application file for complete search history.

(56) References Cited

U.S. PATENT DOCUMENTS

| 6,204,806 | B1 | 3/2001 | Hoech | |
| 6,429,808 | B1* | 8/2002 | King et al. | 342/357.02 |
| 2003/0064733 | A1* | 4/2003 | Okanoue et al. | 455/456 |
| 2005/0227709 | A1* | 10/2005 | Chang et al. | 455/456.1 |
| 2007/0159389 | A1* | 7/2007 | Tekinay et al. | 342/357.09 |
| 2008/0183376 | A1* | 7/2008 | Knockeart et al. | 701/119 |
| 2009/0124253 | A1* | 5/2009 | Radic et al. | 455/427 |

* cited by examiner

*Primary Examiner* — Barry W Taylor

(57) ABSTRACT

A Global Positioning System (GPS) system includes multiple GPS application servers. The multiple GPS application servers provide GPS assistant information for locating a mobile terminal. The mobile terminal receives GPS information from multiple GPS satellites. The GPS assistant information is determined based on a GPS position and a geographic position of a GPS application server of the multiple GPS application servers. The GPS application server is nearest of the multiple GPS application servers to the mobile terminal, and the geographic position of the GPS application server is known.

17 Claims, 3 Drawing Sheets

GPS APPLICATION USING NETWORK ASSISTANCE

CROSS REFERENCE TO PROVISIONAL APPLICATION

This application claims priority to the provisional patent application, Ser. No. 60/714,890, entitled "GPS Application Using Network Assistance," with filing date Sep. 6, 2005, and assigned to the assignee of the present invention, which is herein incorporated by reference in its entirety.

TECHNICAL FIELD

The present invention is related to a Global Positioning System (GPS), and more particularly, to a GPS system for precisely locating the position in an indoor environment.

BACKGROUND ART

The use of a Global Positioning System (GPS) satellite constellation for obtaining a terrestrial position fix (latitude, longitude, and altitude) is widespread and well known. It has been proposed that mobile terminals (such as, but not limited to, cellular telephones, personal digital assistants, etc.) in modern wireless telecommunications systems include a capability to receive GPS signals and calculate position on the surface of the Earth.

In an indoor environment, GPS signals from the GPS satellites are weak. For implementing precise positioning indoors, GPS enabled devices require not only a higher level of sensitivity but also assistant information, such as Time Doppler shift, Broadcasting Ephemeris, and Almanac for quick positioning information. The assistant information is transmitted as Assisted GPS (AGPS) information. However, mobile networks do not support AGPS in some areas.

SUMMARY OF INVENTION

The present invention provides a method and an approach for implementing the transmission of the GPS assistant information so as to precisely locate the position of a GPS device in a mobile phone in an indoor environment. Furthermore, the method or approach, in accordance with embodiments of the present invention, is also suitable to be operated in non-indoor situations.

The present invention implements a child locator system, in accordance with one embodiment. In another embodiment, the present invention implements a locating service between any two terminals.

In accordance with one embodiment of the present invention, a Global Positioning System (GPS) system comprises a user end, a mobile terminal, a positioning server, a GPS application server, and a base station network. The mobile terminal has a GPS receiver to receive GPS information from a plurality of GPS satellites. The positioning server is coupled to one user end through the network. The GPS application server is coupled to the network for communicating with the positioning server, and has a GPS receiver to receive GPS information from the GPS satellites so as to calculate a position of the GPS application server. The geographic position of the GPS application server is known, and GPS assistant information is determined based on the calculated position and the geographic position of the GPS application server. The base station network communicates with the mobile terminal to obtain the GPS information of the mobile terminal and locate the mobile terminal based on the GPS information of the mobile terminal and the GPS assistant information.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DESCRIPTION OF THE EMBODIMENT

Reference will now be made in detail to the embodiments of the present invention, GPS application using network assistance. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
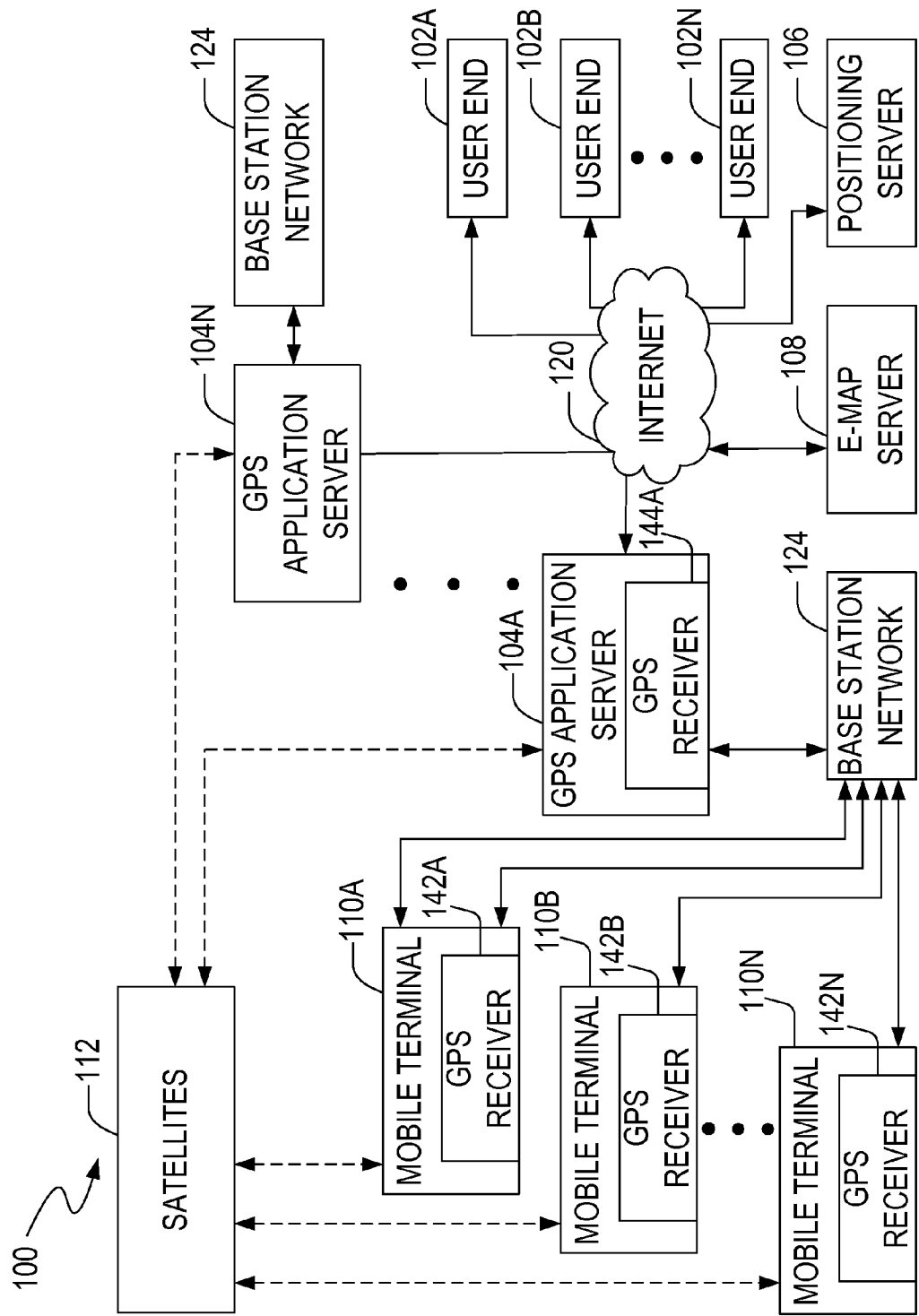
FIG. 1 is a block diagram of a system for positioning a mobile terminal, in accordance with an embodiment of the present invention.

Referring to FIG. 1, a system 100 for locating the positions of mobile terminals 110A through 110N in accordance with one embodiment of the present invention is illustrated. The system 100 comprises one or more user ends 102A through 102N. Any one of the user ends 102A-N can communicate with a service provider (SP) server, such as a positioning server 106, via a network. In accordance with one embodiment of the present invention, the user end 102A communicates with the positioning server 106 via Internet 120 through TCP/IP (Transmission Control Protocol/Internet Protocol) protocols so as to implement real-time, rapid data communication.

Each of the user ends 102A-N can be any terminal which is coupled to Internet 120. For example, the user ends 102A-N include but are not limited to a personal computer, a laptop computer, a Personal Digital Assistant (PDA), etc. It will be apparent to those skilled in the art that one of the user ends 102A-N also can be a terminal which is coupled to Internet 120 through a local area network (LAN) or a wireless local area network (WLAN), in other embodiments of the present invention.

The system 100 according to the embodiment of the present invention further comprises one or more electronic devices or GPS mobile terminals 110A through 110N. Each of the mobile terminals 110A-N is provided with GPS functionality and comprises corresponding GPS receivers 142A-N. The GPS mobile terminals 110A-N can be any type of cellular phone. For example, in accordance with one embodiment of the present invention, the GPS mobile terminal 110A is a GSM cellular phone.

In accordance with one embodiment of the present invention, the GPS receiver 142A of the GPS mobile terminal 110A is able to acquire GPS satellite information from a plurality of GPS satellites 112. For example, locking onto the signals from multiple orbiting GPS satellites provides the capability to accurately calculate a position of the GPS mobile terminal 110A. In addition, the movement of the GPS mobile terminal 110A can also be tracked using signals from the orbiting GPS satellites 112.

As mentioned hereinabove, the system 100 according to an embodiment of the present invention is used for locating the position of the mobile terminals 110A-N. In one example operation, the user end 102A is used to monitor the positions of the mobile terminal 110A. The user end 102A can send a request to the mobile terminal 110A for obtaining the positions of the mobile terminal 110A, and thus serves as a parent end of the system 100. The mobile terminal 110A, after receiving the request from the user end 102A, sends the position information of the mobile terminal 110A to the user end 102A, and thus serves as a child end of the system 100.

Furthermore, in accordance with one embodiment of the present invention, the mobile terminals 110A-N can be attached to or carried by any moving device. For example, the mobile terminal 110A can be carried by a vehicle, a taxi, a box car, a ship, item of consumer goods, etc. As such, the user end 102A can monitor the position of the moving device associated with the mobile terminal 110A for managing or tracking the moving device.

As mentioned hereinbefore, the mobile terminal 110A requires assistant information for positioning. The system 100 comprises GPS application servers 104A-N for providing the GPS assistant information to the mobile terminal 110.

In accordance with one embodiment of the present invention, the positioning server 106 is used to communicate data between the user ends 102A-N and the GPS application servers 104A-N. For example, the positioning server 106 is used to communicate data between the user ends 102A-N and the GPS application servers 104A-N through the Internet 120, in one embodiment. As such, the positioning server 106 is working as a communication center. In accordance with another embodiment of the present invention, one of the user ends 110A-N is constructed to work as a position server.

The GPS application server 104A comprises a GPS receiver 144A to acquire the GPS signals from the GPS satellites 112, in accordance with one embodiment of the present invention. The GPS application server 104A is stationary in one embodiment. The geographical position of the GPS application server 104A is fixed or known. In other words, the position information, such as the longitude, the latitude, and the altitude, of the GPS application server 104A is known and constant. When the position information of the GPS application server 104A and the position information of the GPS signals received by the GPS receiver 144A of the GPS application server 104A are compared, the GPS assistant information, such as the Doppler shift, the number of satellites, reference time, reference location, can be obtained for the nearby area. More specifically, the position information of the GPS application server 104A that is known and constant is compared with position information of the GPS application server 104A determined from GPS information from the GPS satellites 112. As such, GPS assistant data can then be determined and used to compensate for GPS errors for all of the mobile terminals 110A-N in that area.

In operation, a user can use any one of the user ends 102A-N to send a request to the positioning server 106 for monitoring the position of a specific mobile terminal of the mobile terminals 110A-N. In one embodiment, each of the mobile terminals 110A-N has an individual identification number. As such, a request from one of the user ends 102A-N includes an identification number which corresponds to a specific mobile terminal of the mobile terminals 110A-N.

It will be apparent to those skilled in the art that a mobile phone system, such as a GSM network, may comprise a plurality of base station subsystems (BSS) each including a plurality of base stations (BS) or base transceiver stations (BTS), and a plurality of base station controllers (BSC). The base station subsystems may be coupled to a network and switching subsystem (NSS) for the handoff of data communications from one BSS to another.

The system 100 according to an embodiment of the present invention further comprises a wireless base station network of transmitting and receiving stations (base station network 124). As shown in FIG. 1, the base station network 124 is shown supporting mobile terminal 110A-N. The base station network 124 and the mobile terminals 110A-N communicate with each other, and comply with a GSM network specification.

More specifically, as mentioned above, the base station network 124 has a plurality of base stations (not shown). When one of the mobile terminals 110A-N communicates with the base station network 124, only the nearest base station of the base station network 124 is used to communicate with the mobile terminal, for example, the mobile terminal 110A. The positions of each of the base stations of the base station network 124 are known. Therefore, the rough estimative position of the mobile terminal 110A can be known according to the position of the base station that is nearest to and communicating with the mobile terminal 110A. Moreover, each of the mobile terminals 110A-N will keep contacting or communicating with the corresponding nearest base station (not shown) of the base station network 124, if the mobile terminals 110A-N are turned on, in one embodiment.

In accordance with one embodiment of the present invention, as an example, after the positioning server 106 of the system 100 receives a request from the user end 102A through the Internet 120, the positioning server 106 communicates with the base station network 124 to obtain the rough position or the city of the specific mobile terminal 110A targeted. Then, according to the rough position or city of the specific mobile terminal 110A, the positioning server 106 communicates with or transmits a signal to one of the GPS application servers 104A-N, which is located in the city or near to the specific base station or the specific mobile terminal 110A.

The selected GPS application server 104A sends the GPS assistant information and a positioning request to the GPS receiver 142A of the targeted mobile terminal 110A through the base station network 124. According to an embodiment of the present invention, the GPS application servers 104A-N can be located anywhere in the world. As mentioned above, the supporting GPS application server 104A comprises the GPS receiver 144A for receiving GPS signals from the GPS satellites 112. As such, since the position of the GPS receiver 144A is known, the GPS application server 104A is able to calculate and provide the GPS assistant data to compensate for GPS errors in the nearby area.

Furthermore, when the positioning server 106 obtains the rough position or the city of the specific mobile terminal 110A from the base station network 124, the supporting GPS application server 104A which is located in the same city or near the specific mobile terminal 110A communicates with and provides the GPS assistant data to the specific mobile terminal 110A.

In accordance with one embodiment of the present invention, the specific mobile terminal 110A receives the position request and the GPS assistant information through the base station network 124. For example, the communications between the mobile terminal 110A and the base station network 124 comply with a GSM network specification. The GPS receiver 142A of the specific mobile terminal 110A acquires the GPS information from the GPS satellites 112. In one embodiment, the position information of the specific mobile terminal 110A is calculated according to the GPS information from the GPS satellites. In another embodiment, the position information of the specific mobile terminal 110A is calculated according to the GPS information from the GPS satellites and the GPS assistant information from the nearby and supporting GPS application server 104A. The calculated position information is communicated to the GPS application server 104A or the positioning server 106 through the base station network 124.

In accordance with another embodiment of the present invention, the specific mobile terminal 110A receives the position request. The GPS receiver 142A of the specific mobile terminal 110A acquires the GPS information from the GPS satellites 112. The mobile terminal 110A sends the GPS satellite information to the supporting GPS application server 104A. In this case, the GPS information received by the GPS receiver 142A from the GPS satellites 112 is sent to the nearby and supporting GPS application server 104A through the base station network 124. The position of the specific mobile terminal 110A is calculated at the nearby GPS application server 104A. In addition, the GPS assistant data can also be provided by means of the nearby and supporting GPS application server 104A for accurately calculating the position of the specific mobile terminal 110A. Therefore, as to GPS mobile terminal 110A, the power consumption and the dimensions of the GPS chip can be significantly reduced.

In accordance with another embodiment of the present invention, the specific mobile terminal 110A receives the position request. The GPS receiver 142A of the specific mobile terminal 110A acquires the GPS information from the GPS satellites 112. The mobile terminal 110A sends the GPS satellite information to the positioning server 106. In this case, the GPS information received by the GPS receiver 142A from the GPS satellites 112 is sent to the positioning server 106 through the base station network 124. The position of the specific mobile terminal 110A is calculated at the positioning server 106. In addition, the GPS assistant data can also be provided by means of the nearby and supporting GPS application server 104A and sent to the positioning server 106 for accurately calculating the position of the specific mobile terminal 110A. Therefore, as to GPS mobile terminal 110A, the power consumption and the dimensions of the GPS chip can be significantly reduced.

In one embodiment, the position data of the specific mobile terminal 110A is sent to the positioning server 106 through the Internet 120. The positioning server 106 will further transmit the position data of the specific mobile terminal 110A to the user end 102A through the Internet 120. The position data is geographic information or data.

In accordance with another embodiment of the present invention, the system 100 according to an embodiment of the present invention further comprises an electrical map (e-map) server 108 to provide an e-map and show the position of the specific mobile terminal in the form of the e-map. In another embodiment, the e-map server 108 is coupled to the positioning server 106 and the user ends 102A-N through the Internet 120. The user can read the e-map through a browsing tool or a browser of a server provided by the positioning server 106. As such, the positioning server 106 can provide GPS data related to the mobile terminal 110A to the e-map server 108 via the Internet 120. The e-map server 108 is able to integrate the GPS data, combined with GPS assistance data if necessary, into an e-map. The e-map server 108 sends to the user ends 102A an e-map that also integrates the position of the mobile terminal 110A.

The position of the mobile terminal 110A can be shown on the e-map. The user can monitor the position of the mobile terminal 110A at the user end 102A. As such, the user has visual information indicating the geographic position of the mobile terminal 110A overlaid on an e-map, in one embodiment. Further, in accordance with one embodiment of the present invention, the e-map server 108, the positioning server 106 and the GPS application server 104A as shown in FIG. 1 are provided by a service provider.

Figure 2:
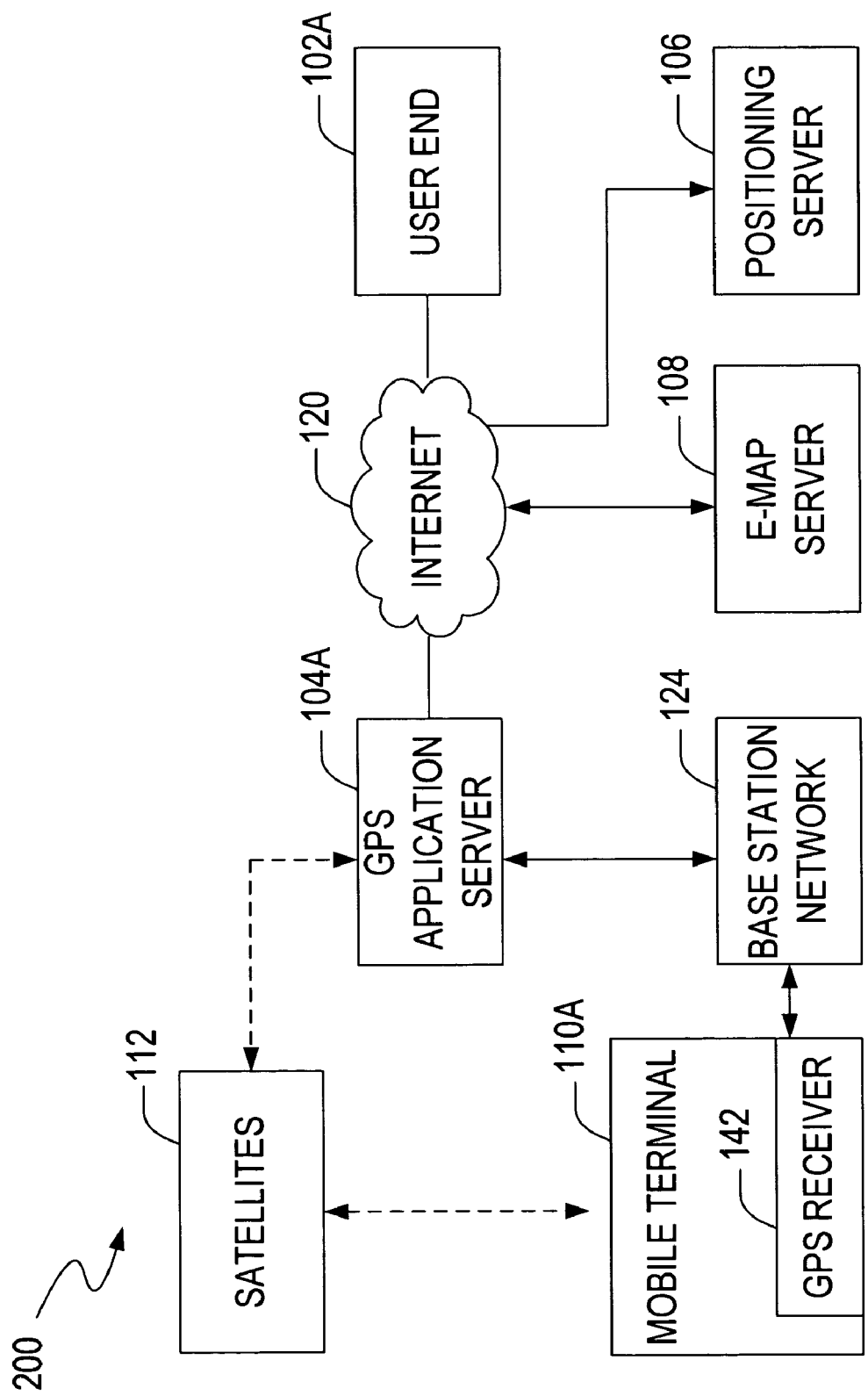
FIG. 2 is a block diagram of a system shown in FIG. 1 for showing the flow of information between a user end and a mobile terminal, in accordance with one embodiment of the present invention.

Referring to FIG. 2, a flow of information between the user end 102A and the mobile terminal 110A shown in FIG. 1 is illustrated. The user end 102A and the mobile terminal 110A in FIGS. 1 and 2 are taken as a descriptive example for illustrating how to use the user end 102A to locate the mobile terminal 110A.

As shown in FIG. 1, using the user end 102A to locate the mobile terminal 110A, a request with the identification number of the mobile terminal 110A is sent to the positioning server 106 through the Internet 120. It will be apparent to those skilled in the art that the mobile terminal 110A keeps communicating with the nearby base station, if it is turned on. The positioning server 106 communicates with the base station network 124. As such, the nearby and supporting base station can be known according to the identification number of the mobile terminal 110A.

Once the nearby and supporting base station is known, the mobile terminal 110A can be roughly located within an area or a city such that the nearby GPS application server 104A can be determined. Further, the GPS assistant data in the area or a city are determined by the nearby GPS application server 104A. Another request then will be sent to the mobile terminal 110A to activate the mobile terminal 110A for receiving GPS information from the GPS satellites 112. The position data of the mobile terminal 110A can be calculated or determined on the basis of the GPS information from the GPS satellites 112 and the GPS assistant data from the GPS application server 104A. As mentioned above, the calculation of the position data of the mobile terminal 110A can be at the mobile terminal 110A, the GPS application server 104A, or the positioning server 106. The positioning server 106 obtains the position data of the mobile terminal 110A and then sends it the user end 102A. The e-map can be sent to the positioning server 106 to virtually show the position of the mobile terminal on the e-map.

Figure 3:
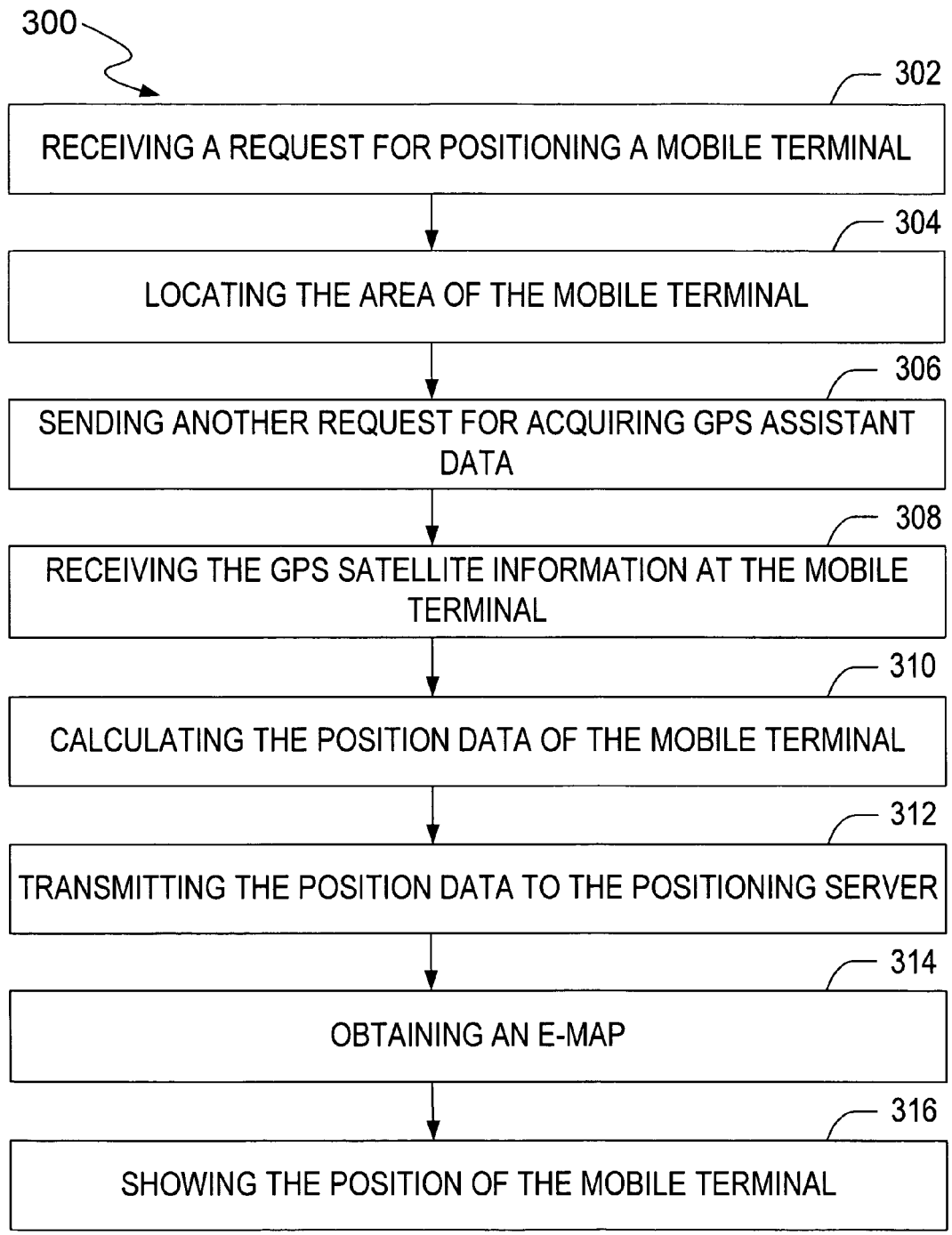
FIG. 3 is a flow diagram showing a method for positioning a GPS mobile terminal, in accordance with an embodiment of the present invention.

Referring to FIG. 3, a method 300 for obtaining the position of an electrical device, such as a GPS mobile terminal, in accordance with one embodiment of the present invention is illustrated. At 302, a user can use a user end, such as a computer or a personal digital assistant (PDA), to send a request to a positioning server through a communication network, such as the Internet, for locating any one of a plurality of mobile terminals. The request includes an identification number to specify a specific mobile terminal of the plurality of mobile terminals.

At 304, once the position server receives the request, the positioning server communicates with a mobile communication network, such as a wireless base station network, to recognize the rough position or the city of the specific mobile terminal. In accordance with one embodiment of the present invention, the mobile communication network complies with GSM standard, and the mobile terminals are mobile phones. It will be apparent to those skilled in the art that the mobile communication network comprises a plurality of base station networks each having a plurality of base stations. Any one of the mobile phone communicates with a nearby base station, the position or corresponding geographic information of which is known. As such, the specific mobile terminal can be located within a city or area which is near the supporting base station communicating with the specific mobile terminal.

At 306, the positioning server transmits another request to a GPS application server in the city or the area, or to a nearest GPS application server for acquiring GPS assistant data within the area. The supporting GPS application server comprises a GPS receiver for receiving GPS information from a plurality of GPS satellites so as to calculate a GPS position information of the GPS application server. The position of the GPS application server is known. Comparing the calculated GPS position information and the position of the GPS application server, GPS assistant data for the corresponding geographic area can be determined to compensate for GPS errors for all of the mobile terminals in that area.

At 308, a request is sent to the specific mobile terminal through the base station network to activate the specific mobile terminal to receive the GPS information from the GPS satellites. The mobile terminal according to an embodiment of the present invention comprises a GPS receiver for receiving the GPS information from the GPS satellites.

At 310, position data of the specific mobile terminal is calculated on the basis of the GPS information received by the mobile terminal from the GPS satellites and the GPS assistant data from the GPS application server. In accordance with one embodiment of the present invention, the GPS assistant data is also transmitted to the specific mobile terminal through the base station network. In this case, the position information of the specific mobile terminal can be calculated at the specific mobile terminal, and transmitted to the GPS application server.

Alternatively, in accordance with one embodiment of the present invention, the GPS assistant data is not transmitted to the mobile terminal, and the position information of the specific mobile terminal is calculated at the GPS application server. In this case, the GPS information received by the mobile terminal from the GPS satellites is transmitted to the GPS application server, and, together with the GPS assistant data, is used to calculate the position information of the specific mobile terminal.

At 312, the calculated position data of the specific mobile terminal is transmitted to the positioning server through the base station network.

At 314, an e-map provider server provides an e-map, which is transmitted to the positioning server through the Internet. In accordance with one embodiment of the present invention, the e-map server is able to integrate the GPS data, combining with GPS assistance data if necessary, into an e-map. The e-map server sends to the user end an e-map that also integrates the positions of the one or more targeted mobile terminals.

At 316, the position data of the specifically targeted mobile terminal is shown on the user end. The position of the mobile terminal can be shown on the E-map. The user monitors the position of the mobile terminal at the user end. As such, the user has visual information indicating the geographic position of the mobile terminal overlaid on an E-map.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A method for locating an electronic device, comprising:
   receiving a first request from an end user device, wherein said first request includes an identifier that specifically identifies a particular electronic device;
   determining, in response to said first request, a rough position of said electronic device based on information received from a base station network;
   selecting a GPS application server from a plurality of GPS application servers based on said rough position, wherein said GPS application server is the nearest of said GPS application servers to said rough position and wherein a geographic position of said GPS application server is known; and
   in response to said first request, using said identifier to identify said electronic device in order to send a second request to said electronic device, wherein said electronic device is activated in response to receiving said second request and sends position information to said end user device via said base station network, and wherein said position information received by said end user device is corrected using GPS assistant information obtained from said GPS application server.

2. The method of claim 1, further comprising calculating a position of said electronic device using GPS satellite information and said GPS assistant information.

3. The method of claim 2, wherein said calculating said position comprises:
   sending said GPS satellite information and said GPS assistant information from said electronic device to a positioning server through said base station network; and
   calculating said position of said electronic device using said positioning server.

4. The method of claim 2, wherein said calculating said position comprises calculating said position using said GPS satellite information and said GPS assistant information at said electronic device.

5. The method of claim 2, further comprising tracking said electronic device using said position of said electronic device.

6. The method of claim 1, wherein said receiving said first request comprises receiving said first request through an internet network.

7. The method of claim 1, further comprising calculating said GPS assistant information by comparing a GPS position of said GPS application server and a geographic position of said GPS application server.

8. The method of claim 1, further comprising:
   establishing communication between said electronic device and a base station of said base station network, wherein said electronic device is within a predetermined distance from said base station; and associating said rough position with a location of said base station.

9. The method of claim 1, further comprising determining said position of said electronic device based on said rough position and said GPS assistant information.

10. A mobile device, comprising:
a GPS chip comprising a GPS receiver operable for acquiring position information from a GPS satellite; and
a transceiver coupled to said GPS chip and operable for communicating said position information to a base station network; wherein an end user device initiates a first request that includes an identifier that specifically identifies said mobile device; wherein in response to said first request said base station network identifies a rough position of said mobile device; wherein said rough position is used to select a GPS application server from a plurality of GPS application servers, said GPS application server the nearest of said plurality to said rough position; wherein said identifier is used to identify said mobile device and to send a second request to said mobile device; wherein said mobile device is activated in response to said second request and sends position information to said end user device via said base station network; and wherein said position information received by said end user device is corrected using GPS assistant information obtained from said GPS application server.

11. The mobile device of claim 10, wherein a position of said mobile device using GPS satellite information and said GPS assistant information.

12. The mobile device of claim 11, wherein said position is calculated by sending said GPS satellite information and said GPS assistant information from said mobile device to positioning server through said base station network, wherein said positioning server calculates said position.

13. The mobile device of claim 12, wherein said position is calculated by calculating said position using said GPS satellite information and said GPS assistant information at said mobile device.

14. The mobile device of claim 12, wherein said mobile device is tracked using said position of said mobile device.

15. The mobile device of claim 10, wherein said first request is received through an internet network.

16. The mobile device of claim 10, wherein said GPS assistant information is calculated by comparing a GPS position of said GPS application server and a geographic position of said GPS application server.

17. The mobile device of claim 10, wherein said mobile device is a predetermined distance from a base station of said base station network, wherein said rough position is associated with a location of said base station.

* * * * *